United States Patent
Piercy

(10) Patent No.: US 10,184,544 B1
(45) Date of Patent: Jan. 22, 2019

(54) CYCLOID TRANSMISSION WITH CHAIN LINK RING

(71) Applicant: X Development LLC, Mountain View, CA (US)

(72) Inventor: Brenton Edward Piercy, San Francisco, CA (US)

(73) Assignee: X DEVELOPMENT LLC, Mountain View, CA (US)

(*) Notice: Subject to any disclaimer, the term of this patent is extended or adjusted under 35 U.S.C. 154(b) by 468 days.

(21) Appl. No.: 15/046,608

(22) Filed: Feb. 18, 2016

Related U.S. Application Data

(63) Continuation of application No. 14/292,967, filed on Jun. 2, 2014, now Pat. No. 9,297,442.

(51) Int. Cl.
*F16H 1/32* (2006.01)

(52) U.S. Cl.
CPC ..................................... *F16H 1/32* (2013.01)

(58) Field of Classification Search
CPC ...... F16H 1/32; F16H 1/321; F16H 2001/323; F16H 2001/325; F16H 13/06; F16H 13/08
See application file for complete search history.

(56) References Cited

U.S. PATENT DOCUMENTS

| | | | |
|---|---|---|---|
| 4,594,915 A | 6/1986 | Braren | |
| 8,468,904 B2 | 6/2013 | Nowicki | |
| 8,506,438 B2 | 8/2013 | Makino | |
| 2006/0035739 A1 | 2/2006 | Osborn et al. | |
| 2014/0309068 A1* | 10/2014 | Xu | F16H 1/32 475/168 |
| 2015/0292498 A1* | 10/2015 | Williams | F04B 47/022 74/41 |
| 2016/0053871 A1* | 2/2016 | Fecko | F16H 3/70 475/168 |
| 2016/0297500 A1* | 10/2016 | Dubose | B62M 6/55 |

FOREIGN PATENT DOCUMENTS

JP 06235444 8/1994

* cited by examiner

*Primary Examiner* — Huan Le
(74) *Attorney, Agent, or Firm* — McDonnell Boehnen Hulbert & Berghoff LLP

(57) ABSTRACT

Examples are provided that describe a cycloid transmission with a chain link ring. An example cycloid transmission includes a motor shaft attached to a disc. The motor shaft may be used for rotating the disc. The cycloid transmission also comprises an outer chain link ring that surrounds the disc. The outer chain link ring includes rollers that are inserted at given interfaces between links of the outer chain link ring. The rollers contact the disc as the disc rotates. The cycloid transmission also comprises a housing. The links of the outer chain link are coupled at the given interfaces. The rollers are inserted at the given interfaces and into the housing.

18 Claims, 13 Drawing Sheets

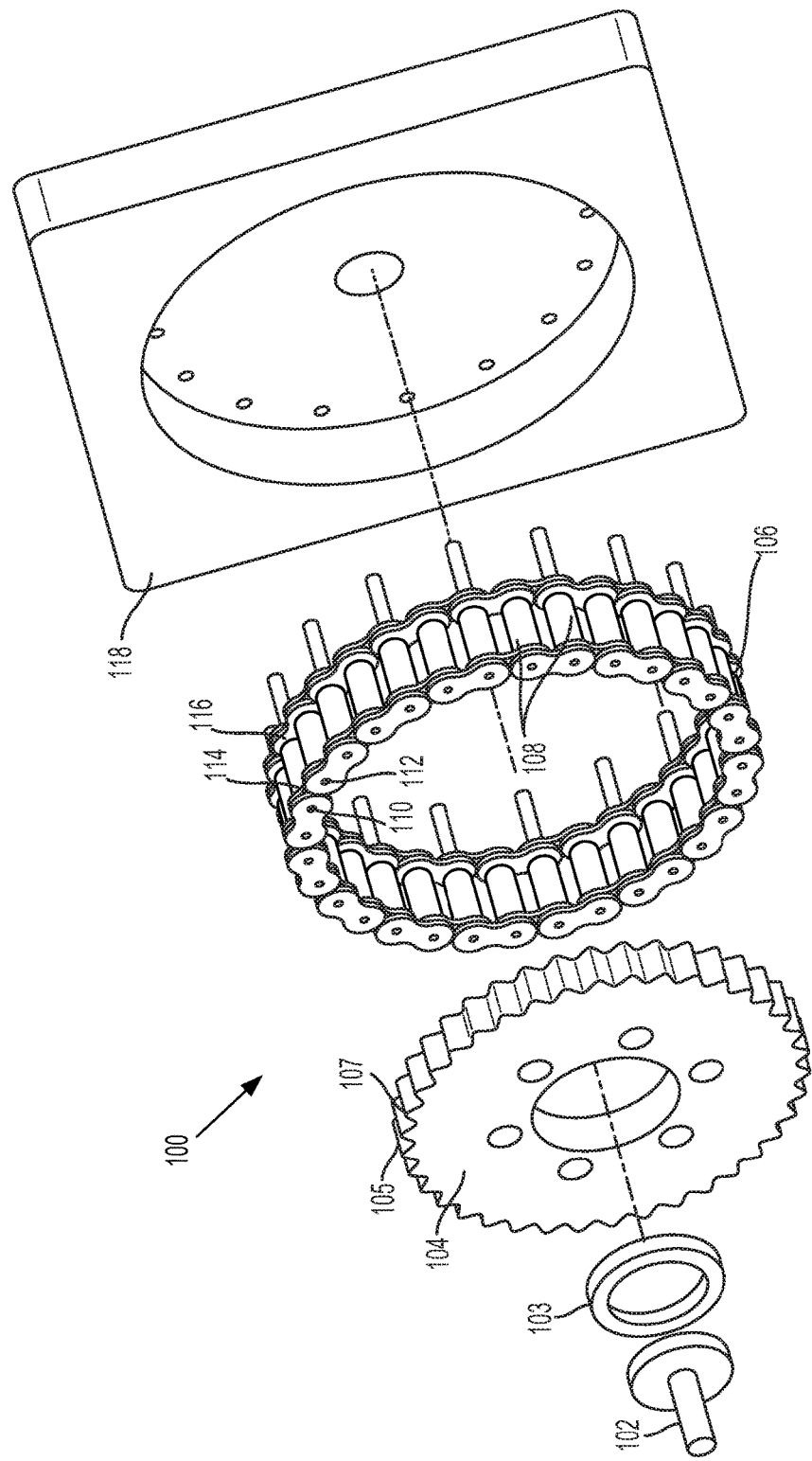

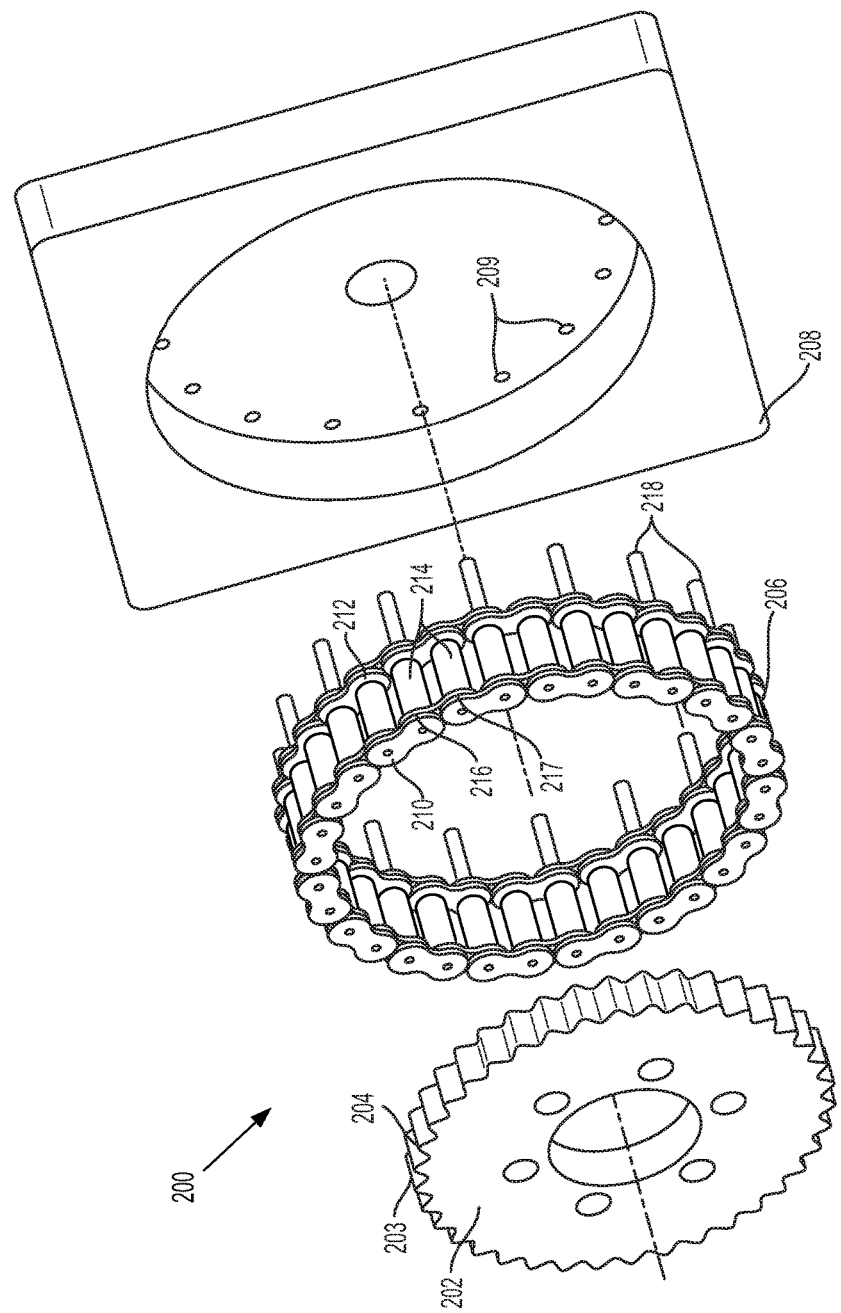

CYCLOID TRANSMISSION WITH CHAIN LINK RING

CROSS REFERENCE TO RELATED APPLICATION

The present disclosure is a continuation of U.S. patent application Ser. No. 14/292,967, filed on Jun. 2, 2014, the entire disclosure of which is herein incorporated by reference.

BACKGROUND

Unless otherwise indicated herein, the materials described in this section are not prior art to the claims in this application and are not admitted to be prior art by inclusion in this section.

Use of electric motor actuators in a wide array of engineering design can be attributed to the ease of introducing motion and the need for preventing motion as required by a mechanism or system. An ability of actuators to enable control without use of oil has also made actuators a popular choice in various implementations. Electric motor actuators for robotic and automation systems often require a transmission (speed reducer) in order to operate within speed-torque requirements of a specific application and of the motor.

As an example, an electric linear actuator may exhibit a high speed and fast response that is useful when high acceleration and an ability to brake quickly are needed. However, linear actuators tend to have a high cost, require a cooling option based on heat generated, and are limited by a length associated with a given application. As another example, a stepper motor has a capability to be highly reliable but with diminishing torque as a speed of the motor is increased. There continues to be a vast majority of robotic and automation systems being developed with the aid of electric motors that are capable of performing a rotational motion.

SUMMARY

In one example, a cycloid transmission is provided that comprises a motor shaft that is attached to a disc. The motor shaft is used for rotating the disc. An outer chain link ring surrounds the disc. The outer chain link ring includes rollers that are inserted at given interfaces between links of the outer chain link ring. The rollers contact the disc as the disc rotates. The cycloid transmission also comprises a housing. The links of the outer chain link are coupled at the given interfaces. The rollers are inserted at the given interfaces and into the housing.

In another example, a cycloid transmission is provided that comprises a disc. The disc includes a surface along an outside perimeter. The disc is surrounded by a chain link ring. The chain link ring includes a plurality of outer links and a plurality of inner links. A plurality of rollers are inserted at given interfaces between the plurality of inner links of the chain link ring. The plurality of rollers contact the disc as the disc rotates. The cycloid transmission also comprises a plurality of pins that connect the plurality of outer links and the plurality of inner links. The chain link ring is supported by a housing. The housing comprises a plurality of slots for receiving respective pins of the plurality of pins. The plurality of slots also allows for a relative position of the chain link ring to the disc to be adjusted.

In another example, a cycloid transmission is provided that comprises a disc and a shaft for rotating the disc. The disc includes a plurality of circular openings. The cycloid transmission also comprises a cage gear. The cage gear comprises a top ring that is coupled to a bottom ring by a plurality of pins. A plurality of rollers covering the plurality of pins and positioned between the top ring and the bottom ring. The plurality of rollers contact the disc as the disc rotates. The cycloid transmission also comprises a housing for supporting the cage gear. The housing comprises a plurality of slots for receiving the plurality of pins.

These as well as other aspects, advantages, and alternatives, will become apparent to those of ordinary skill in the art by reading the following detailed description, with reference where appropriate to the accompanying figures.

BRIEF DESCRIPTION OF THE FIGURES

FIG. 1A illustrates an exploded view of an example cycloid transmission.

FIG. 2A illustrates an exploded view of another example cycloid transmission.

DETAILED DESCRIPTION

Figure 1B:
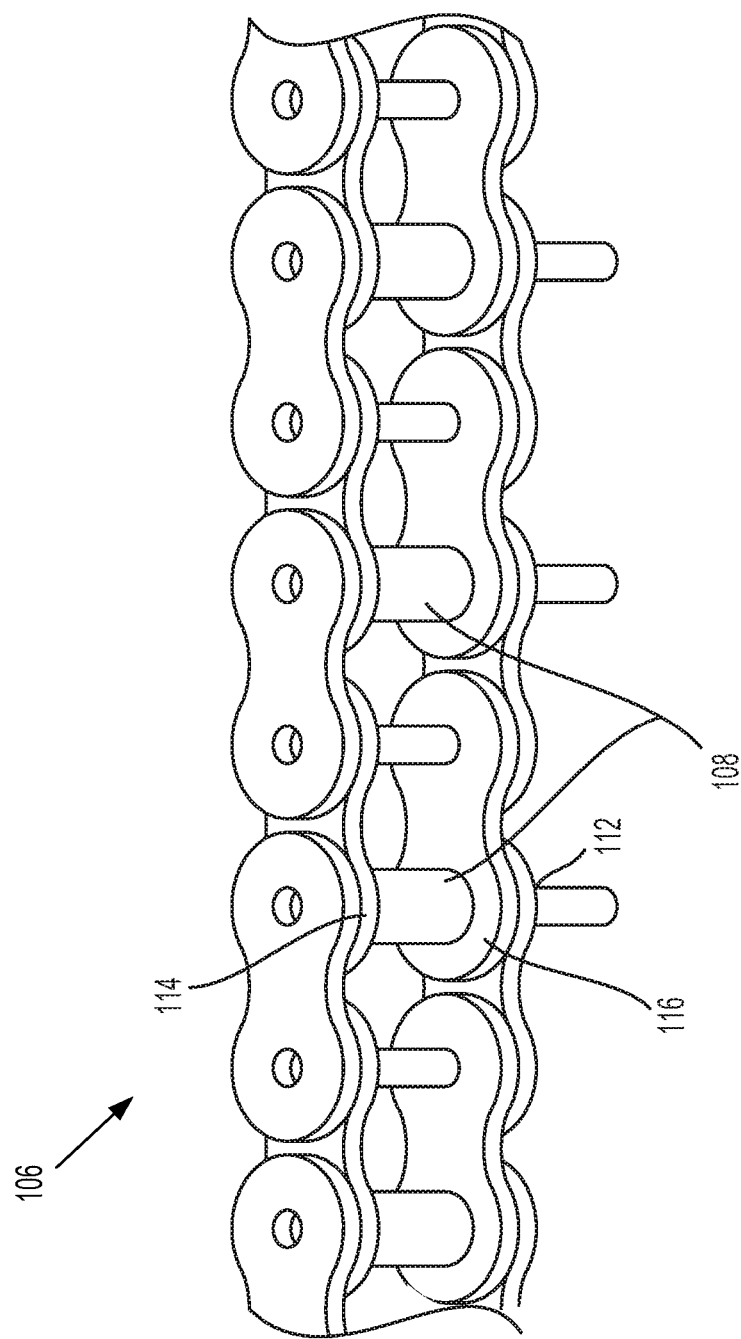
FIGS. 1B-1D illustrate a portion of various examples of a chain link ring.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Examples described herein include subsystems that enable a robotic end effector, including a cycloid transmission, to operate in a rotational manner for an extended period of time. The cycloid transmission may include a motor shaft that is attached to a disc. The motor shaft may be used to rotate the disc around an outer chain link ring that surrounds the disc. The outer chain link ring may include rollers that may be inserted at given interfaces between links of the outer chain link ring. The rollers may serve to contact the disc as the disc rotates. The cycloid transmission may include a housing wherein the links of the outer chain link ring are coupled at the given interfaces. The rollers are inserted at the given interfaces and into the housing.

Referring now to the figures, FIG. 1A illustrates an exploded view of an example cycloid transmission 100. The cycloid transmission 100 comprises a motor shaft 102 coupled to a bushing 103. The bushing 103 may be positioned between the motor shaft 102 and a disc 104 as is illustrated in FIG. 1A. The motor shaft 102 may be used to rotate the disc 104. The cycloid transmission 100 comprises an outer chain link ring 106 that surrounds the disc 104 as is illustrated in FIG. 1A.

The disc 104 may also comprise a plurality of teeth 105 along an outer edge 107 of the disc 104. The plurality of teeth 105 may interface with the outer chain link ring 106. The plurality of teeth 105 may be adjusted to any given number based on the desired speed reduction associated with the cycloid transmission 100. The outer chain link ring 106 may also be adjusted in order to accommodate any adjustments made to the plurality of teeth 105 of the disc 104.

Within the cycloid transmission 100, the outer chain link ring 106 may include rollers 108 inserted at given interfaces 110 and 112 between links 114 and 116 of the outer chain link ring 106. The rollers 108 will minimize a friction associated with the rollers 108 and the disc 104 as the rollers 108 and the disc 104 come into contact. A minimization in friction between the rollers 108 and the disc 104 may result in a longer life span of the outer chain link 106 and the disc 104 due to less wear associated with the rollers 108 and the disc 104.

The cycloid transmission 100 may also include a housing 118 as is shown in FIG. 1A. The links 114 and 116 of the outer chain link ring 106 may be coupled at the given interfaces 110 and 112. The rollers 108 may be inserted at the given interfaces 110 and 112 and at least some of the rollers 108 may be inserted into the housing 118.

Figure 1C:
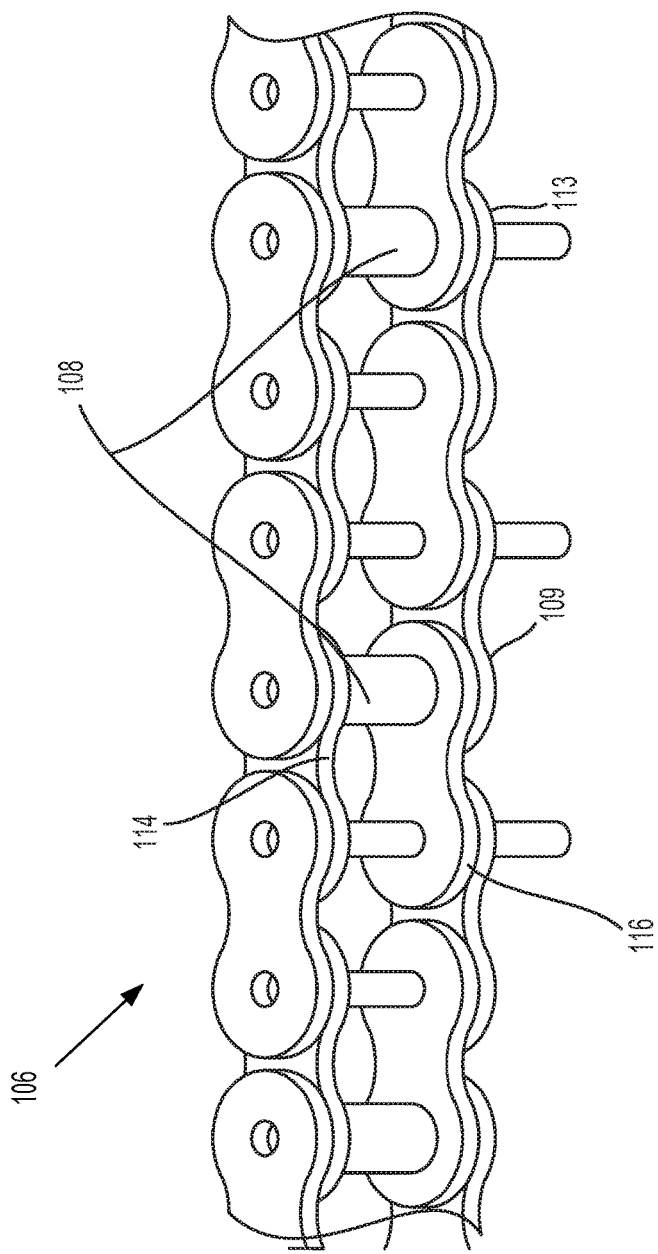
Figure 1D:
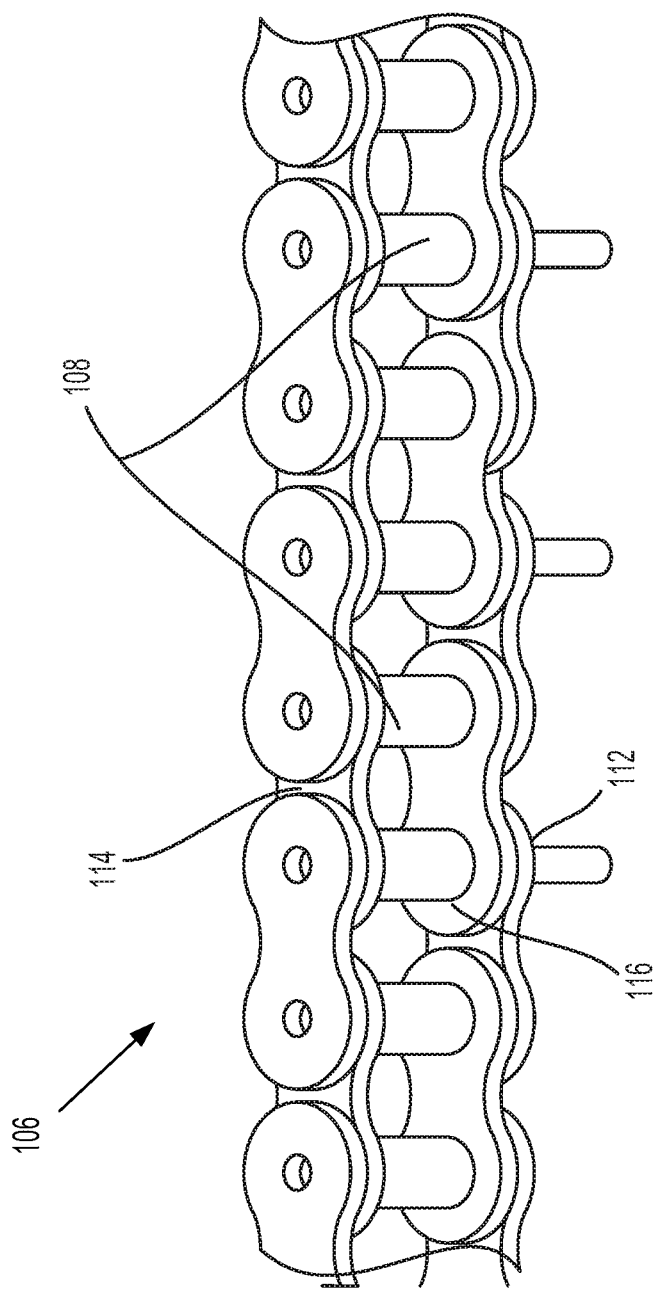

FIGS. 1B-1D illustrate a few different examples associated with the outer chain link ring 106.

In FIG. 1B, a portion of the outer chain link ring 106 is shown. In one example, the outer chain link ring 106 may comprise insertion of the rollers 108 at every other interface 112 between links 114 and 116 of the outer chain link ring 106 as is shown in FIG. 1B.

In FIG. 1C, a portion of the outer chain link ring 106 is shown. In one example, the outer chain link ring 106 may comprise insertion of the rollers 108 at the given interfaces 109 and 113 between links 114 and 116 of the outer chain link ring 106 based on a pattern other than insertion into every interface as is shown in FIG. 1C.

In one example, the outer chain link ring may comprise the use of a rubber seal such as a rubber o-ring or a rubber x-ring. The use of the rubber seal can assist with vibration damping and also lessen the need for lubrication. An internal lubrication of the outer chain link ring may be kept in place by the use of the rubber seal. The rubber seal could also help to extend the life of the outer chain link ring by preventing contaminants from entering various places of the outer chain link ring. A properly lubricated outer chain link ring will require less servicing and thereby lower the cost of maintenance associated with the cycloid transmission.

In one example, the outer chain link ring may comprise a double row chain link ring. The double row chain link ring would enable a second disc to be used in the cycloid transmission. The second disc could be phased at 180 degrees from the disc in order reduce vibration and provide a smaller bearing size. It is also possible to use a triple row chain link ring with a third disc in addition to the disc and the second disc.

In FIG. 1D, a portion of the outer chain link ring 106 is shown. In one example, the outer chain link ring 106 may comprise insertion of the rollers 108 at every interface 112 between links 114 and 116 of the outer chain link ring 106 as is shown in FIG. 1D.

By adjusting a number of the rollers 108 that are used in the outer chain link ring 106, it may be possible for various configurations of the disc 104 to be implemented within an example cycloid transmission. This may permit a reduction ratio to be achieved based on the specific requirements of the cycloid transmission.

Figure 2B:
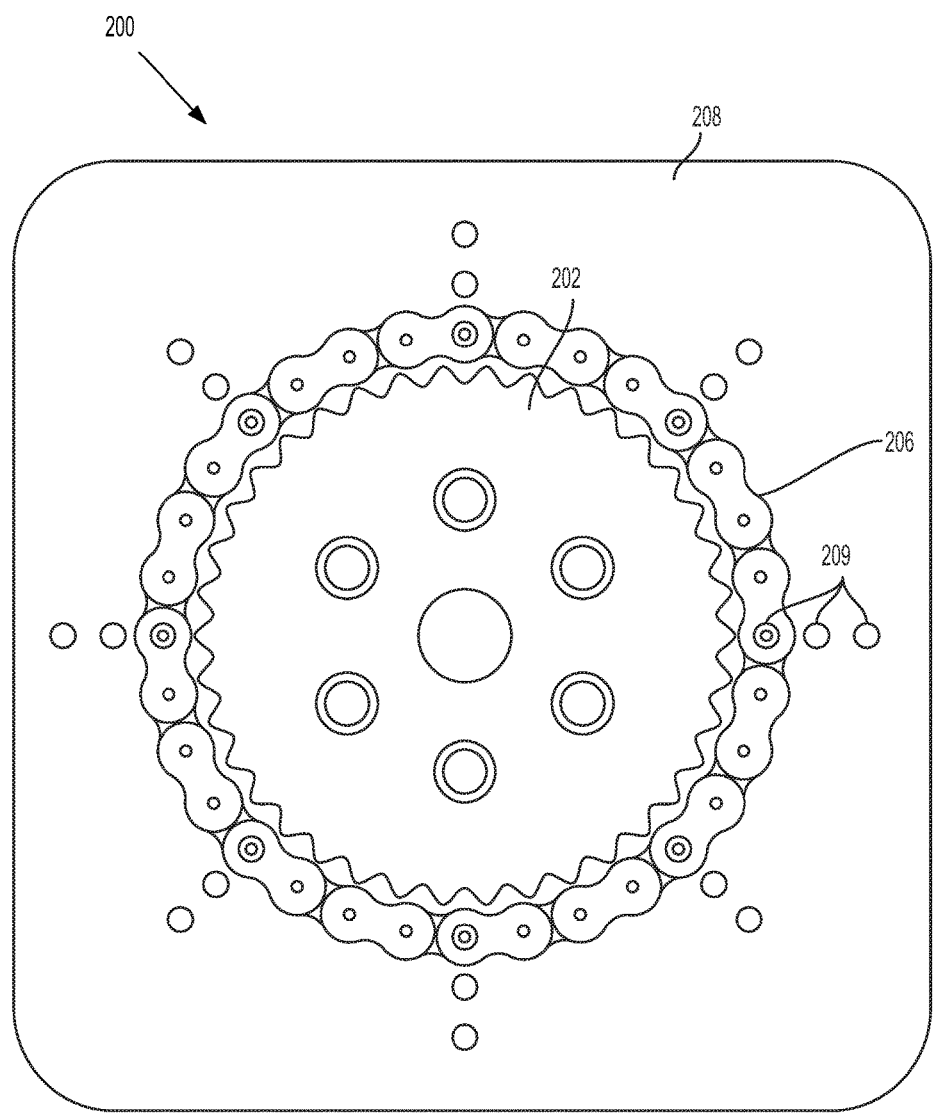
FIG. 2B illustrates a top view of another example cycloid transmission.

FIGS. 2A and 2B illustrate two views of an example cycloid transmission 200.

FIG. 2A illustrates an exploded view of an example cycloid transmission 200. The cycloid transmission 200 comprises a disc 202 surrounded by a chain link ring 206. As is shown in FIG. 2A, the cycloid transmission 200 includes a housing 208 for supporting the chain link ring 206.

The disc 202 includes a surface 203 along an outside perimeter 204. The surface 203 makes contact with the chain link ring 204 as the disc 202 rotates.

The chain link ring 206 includes a plurality of outer links 210 and a plurality of inner links 212. As is shown in FIG. 2A, a plurality of rollers 214 are inserted at given interfaces 216 and 217 between the plurality of inner links 212 of the chain link ring 206. The plurality of rollers 214 contact the disc 202 as the disc 202 rotates. The chain link ring 206 includes a plurality of pins 218 that connect the plurality of outer links 210 and the plurality of inner links 212.

Referring to FIG. 2A, the housing 208 comprises a plurality of slots 209 for receiving respective pins of the plurality of pins 218.

In one example, a given pin from the plurality of pins 218 is inserted at every other slot of the plurality of slots 209.

In one example as shown in FIG. 2A, the plurality of outer links 210 are coupled at the given interfaces 216 and 217. Respective pins from the plurality of pins 218 are inserted through the given interfaces 216 and 217 and into the housing 208.

In one example after a given period of time, the plurality of rollers 214 may no longer contact the surface 203 of the disc 202 as required by the cycloid transmission 200 due to a wearing away of the surface 203 of the disc 202. Adjustment of a relative position of the chain link ring 206 to the disc 202 may allow for an improvement in operation by ensuring that a close contact between the surface 203 of the disc 202 and the plurality of rollers 214 continues to occur.

FIG. 2B illustrates a top view of the cycloid transmission 200. Referring to FIG. 2B, the plurality of slots 209 allow for the relative position of the chain link ring 206 to the disc 202 to be adjusted based on positioning of the chain link ring 206 in the housing 208 and a selection of which slots 209 to utilize.

In one example, the plurality of slots 209 are configured in a circular pattern within the housing 208 as is shown in FIG. 2B.

Figure 2C:
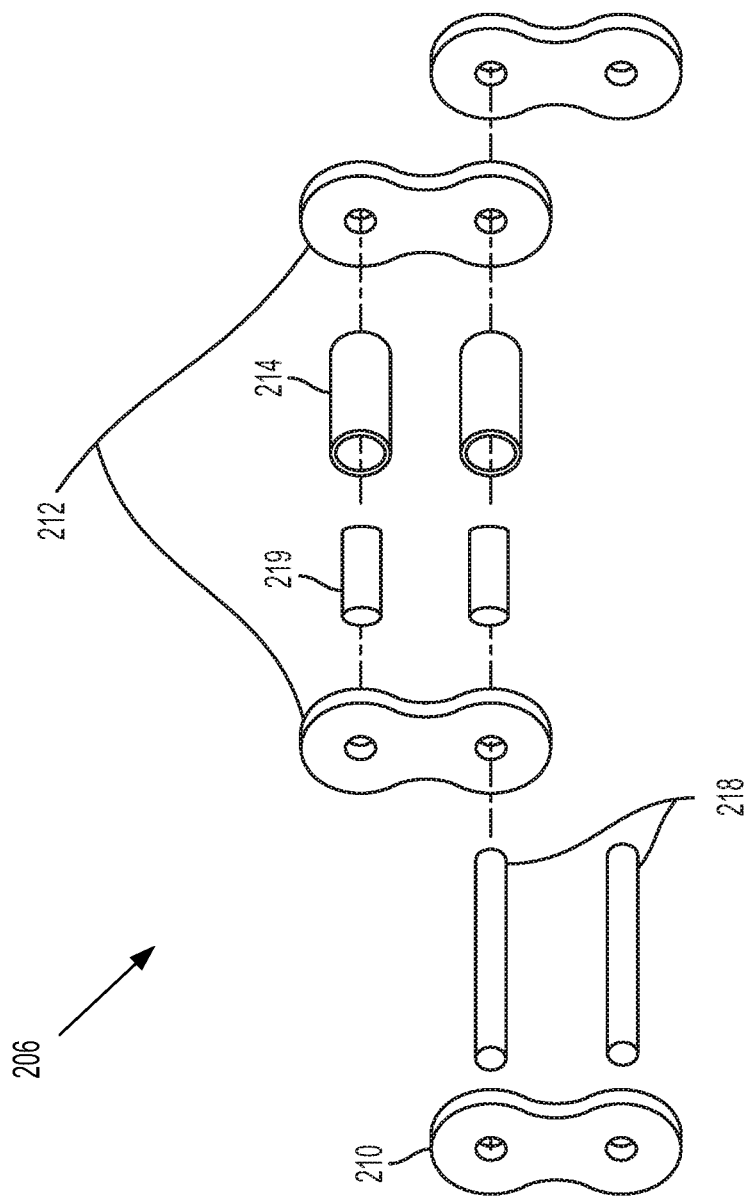
FIG. 2C illustrates exploded view of a portion of an example chain link ring.

Referring to FIG. 2C, an exploded view of a portion of the outer chain link ring 206 is shown. The outer chain link ring 206 may include the plurality of outer links 210 that are coupled to the plurality of inner links 212 by the plurality of pins 218.

In one example, the plurality of pins 218 are surrounded by a plurality of bushings 219. The plurality of bushings 219 are surrounded by the plurality of rollers 214. The plurality of bushings 219 allow for the plurality of rollers 214 to move freely around the plurality of bushings 219 as the plurality of rollers 214 may contact with the disc 202. The plurality of bushings 219 may reduce a friction associated with the plurality of rollers 214 and the disc 202 as the plurality of rollers 214 and the disc 202 come into contact. A reduction in the friction may increase the life span of the cycloid transmission 200.

Figure 2D:
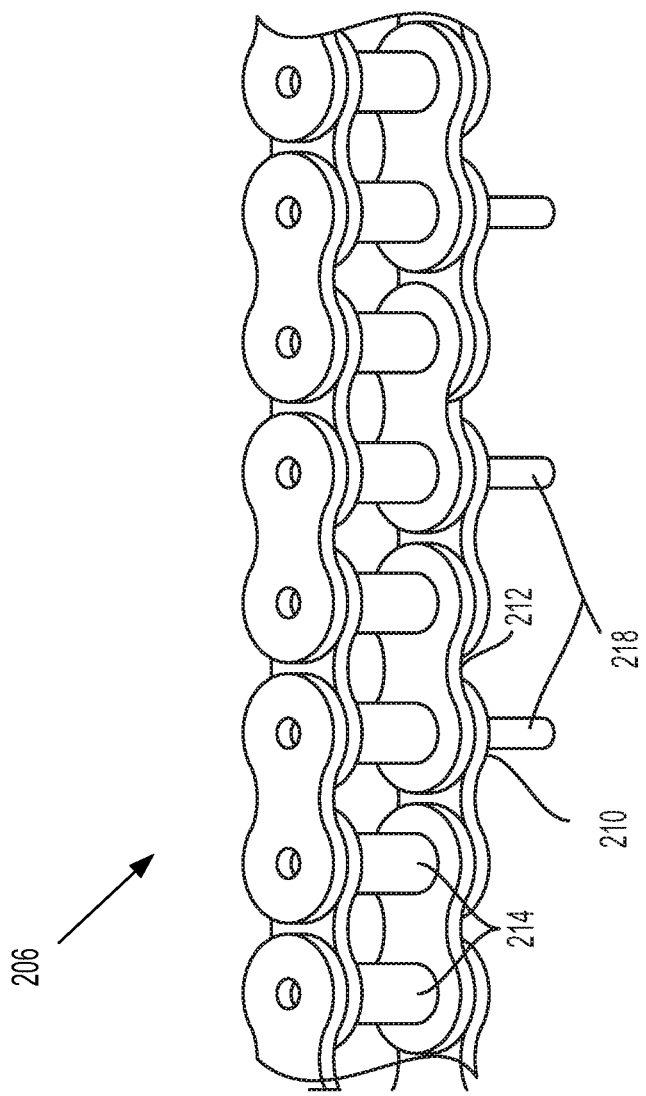
FIG. 2D illustrates a portion of another example chain link ring.

Referring to FIG. 2D, a portion of the outer chain link ring 206 is shown. Referring to FIG. 2D, the plurality of pins 218 protrudes from the plurality of outer links 210.

Figure 2E:
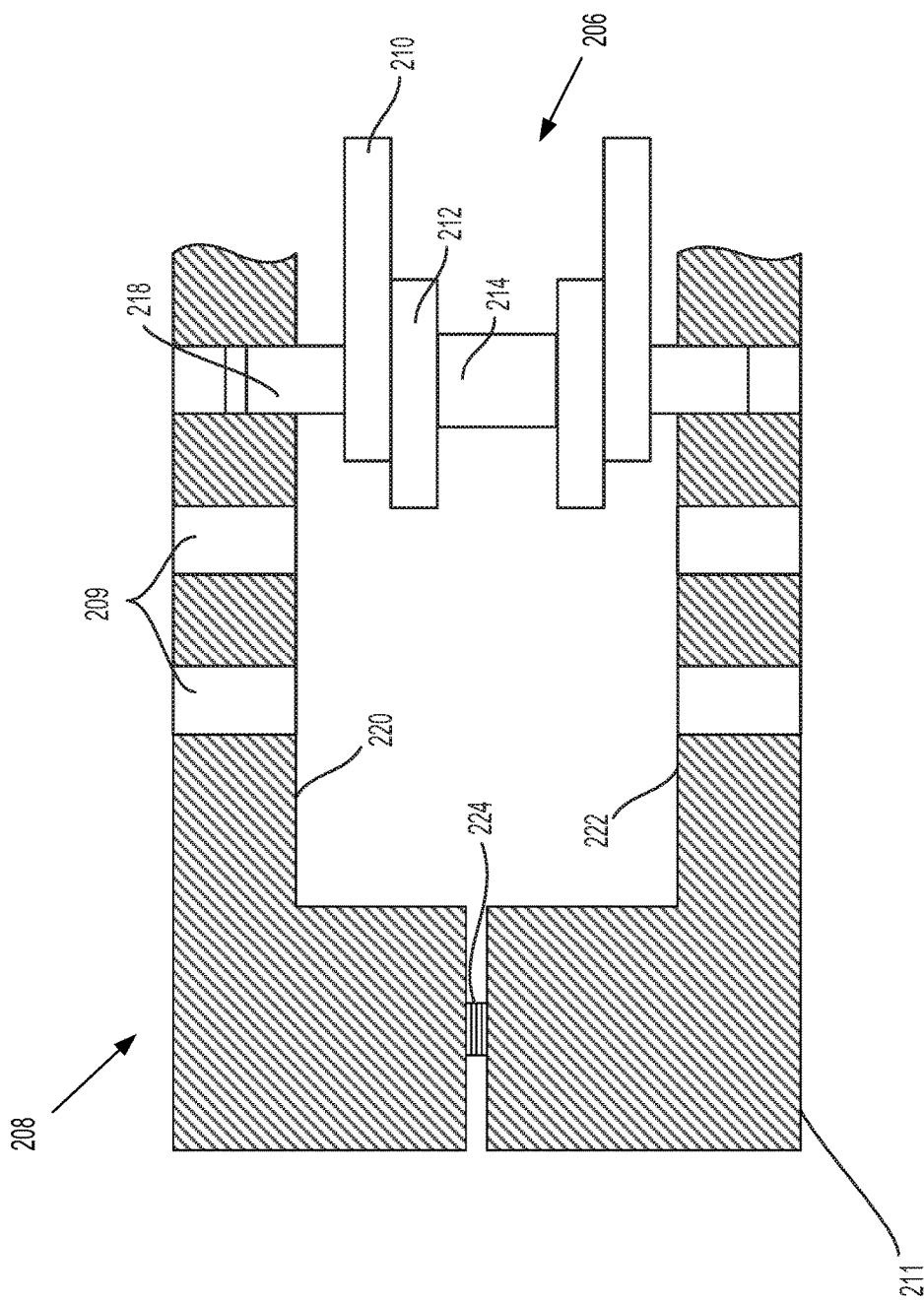
FIG. 2E illustrates a cross-sectional view of an example channel.

FIG. 2E illustrates a cross-sectional view of a portion of the housing 208. In one example, the housing 208 comprises a channel 211 to receive the chain link ring 206 as is shown in FIG. 2E. The channel 211 may include the plurality of slots 209. The plurality of pins 218 may be positioned within the plurality of slots 209.

As the disc 202 rotates around the outer chain link ring 206, a radial force from the disc 202 towards the outer chain link ring 206 may form. This radial force may cause the plurality of outer links 210 and the plurality of inner links 212 to make contact with a given internal side of the housing 208. Due to a cavity associated within the channel 211, the channel 211 may allow a certain degree of a movement of the outer chain link ring 206 that is away from the disc 202 without the chain link ring 206 making contact with any internal side of the housing 208. Removing any contact between the chain link ring 206 and the housing 208 based on the radial force from the disc 202, may serve to extend the life of the chain link ring 206.

In one example, the channel 211 may include a plurality of slots 209 that are located on a top 220 and a bottom 222 of the channel 211 as is shown in FIG. 2E. This may allow for a given pin of the plurality of pins 218 to be positioned at a given slot of the plurality of slots 209. As is shown in FIG. 2E, the plurality of pins 218 may be held in on the top and the bottom of the channel.

In one example, the top 220 of the channel 211 is removable in order to provide access to the chain link ring 206. The top 220 of the channel 211 may be coupled to the bottom 222 of the channel 211 by a fastener 224 as is shown in FIG. 2E. Enabling the top 220 of the channel 211 to be removed would permit the chain link ring 206 to be replaced or serviced in order to increase an ease of service associated with the cycloid transmission 200. The capability to replace or service the chain link ring 206 may also help to reduce a need for a tight tolerance associated with manufacturing of the housing.

Figure 3A:
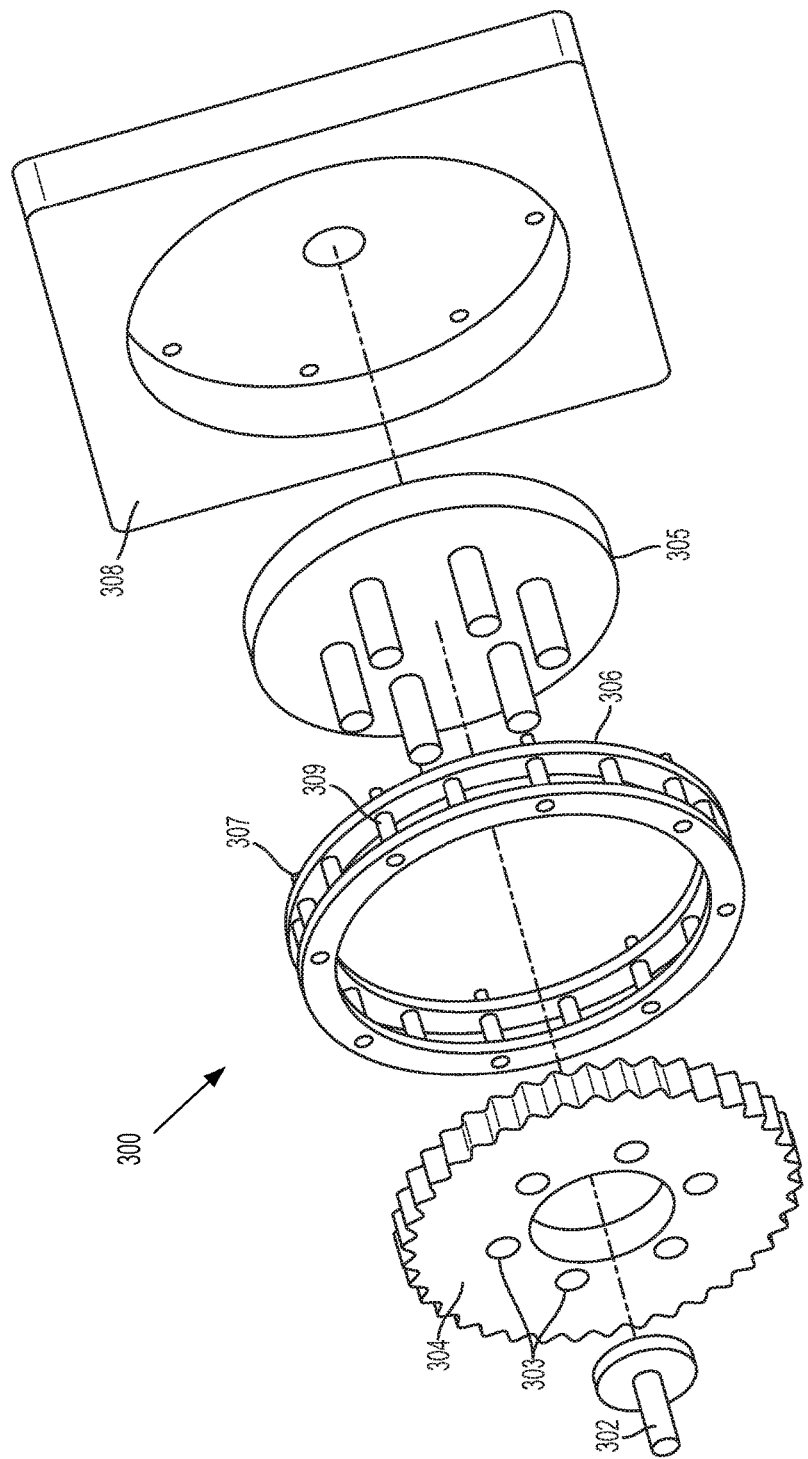
FIG. 3A illustrates an exploded view of another example cycloid transmission.

FIG. 3A illustrates an exploded view of another example cycloid transmission 300.

Referring to FIG. 3A, the cycloid transmission 300 comprises a shaft 302 for rotating a disc 404. The cycloid transmission 300 comprises a cage gear 306 and a housing 308 for supporting the cage gear 306 as is shown in FIG. 3A.

Referring to FIG. 3A, a plurality of rollers 309 contact the disc 404 as the disc 404 rotates.

In one example, the disc may include a plurality of circular openings 303 as is shown in FIG. 3A.

Referring to FIG. 3A, in one example the cycloid transmission 300 comprises a plurality of output shaft rollers 305. The plurality of output shaft rollers 305 are inserted through the plurality of circular openings 303 in order to stabilize a motion of the disc 404 as the disc 404 rotates.

Figure 3B:
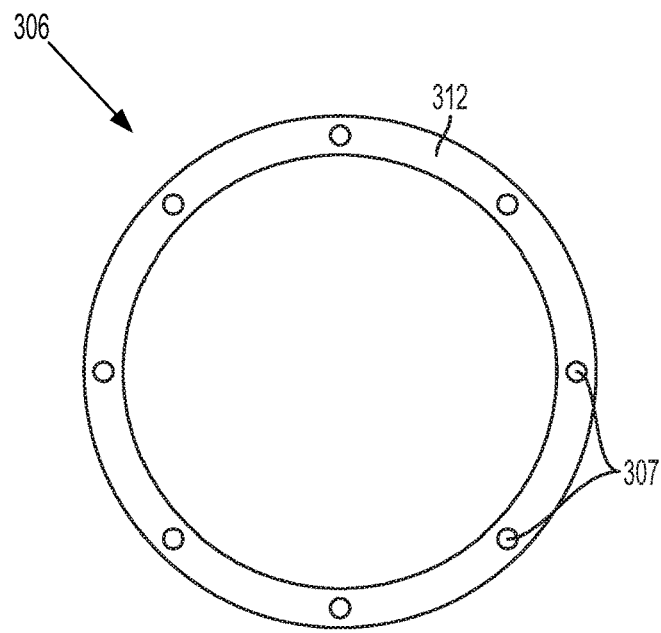
FIGS. 3B-3C illustrate bottom and side views of an example cage gear.
Figure 3C:
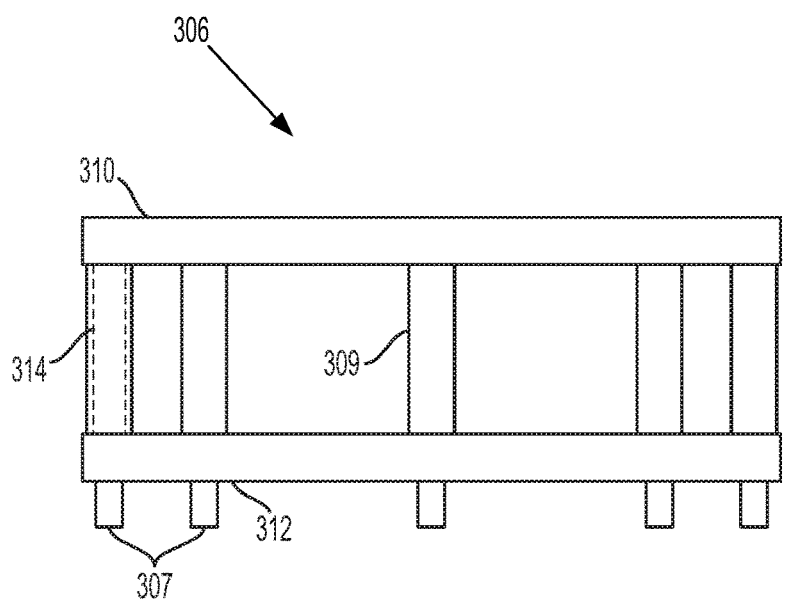

FIGS. 3B and 3C provide two different views of the cage gear 306.

Referring to FIG. 3B, a bottom view of the cage gear 306 is shown. A plurality of pins 307 coupled to a bottom ring 312 is shown in FIG. 3B.

Referring to FIG. 3C, a side view of the cage gear 306 is shown. A top ring 310 is coupled to the bottom ring 312 by the plurality of pins 307. The plurality of rollers 309 are positioned over the plurality of pins 307 and between the top ring 310 and the bottom ring 312 as is shown in FIG. 3C.

In one example, the cage gear 306 includes a first annular body coupled to a second annular body by the plurality of pins 307 as is shown in FIG. 3C.

In one example, a plurality of bushings 314 may be positioned between the plurality of pins 307 and the plurality of rollers 309 as is shown in FIG. 3C. Positioning the plurality of bushings 314 between the plurality of pins 307 and the plurality of rollers 309 may minimize a friction between the plurality of pins 307 and the plurality of rollers 309 as the plurality of rollers 309 contact the disc 404.

Referring to FIG. 3C, in one example the plurality of pins 307 protrudes from the bottom ring 312. This may allow for the cage gear 306 to be secured into the housing 308.

Figure 3D:
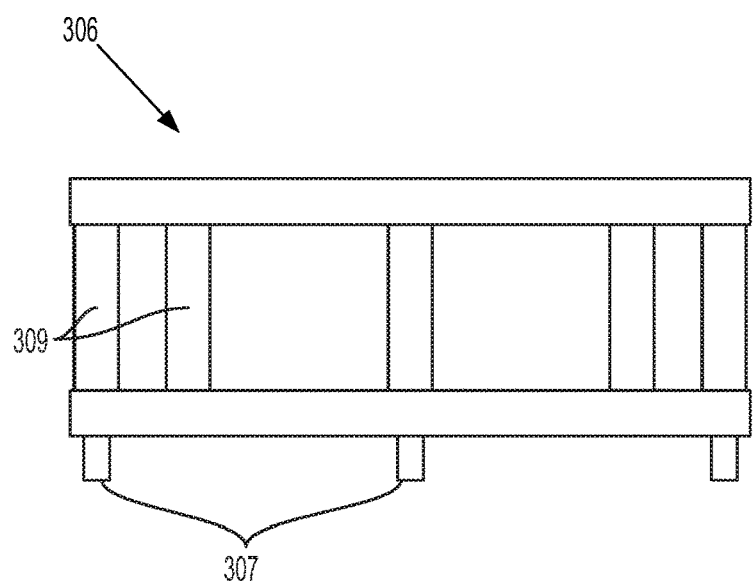
FIG. 3D illustrates a side view of another example cage gear.
Figure 3E:
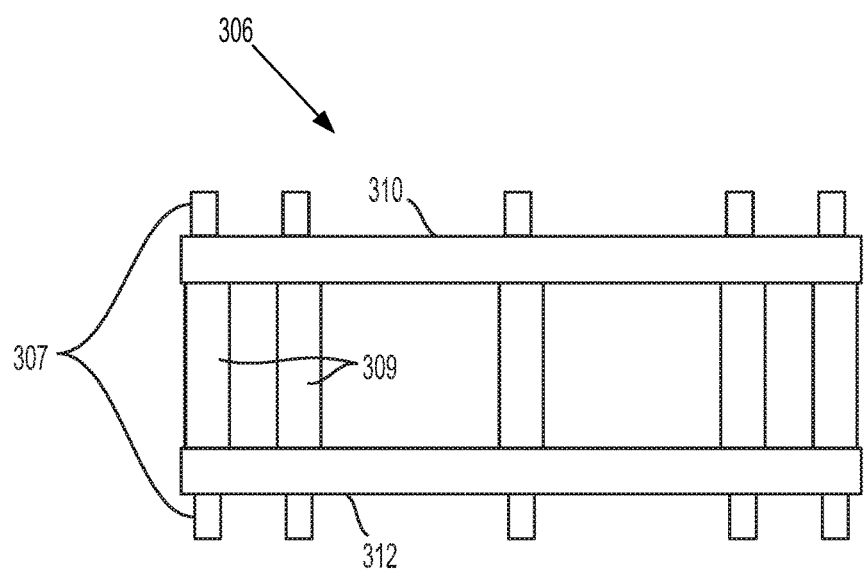
FIG. 3E illustrates another side view of another example cage gear.

FIGS. 3D and 3E illustrate various examples of the cage gear 306.

Referring to FIG. 3D, in one example the plurality of pins 307 protrudes at every other location associated with the plurality of rollers 309.

Referring to FIG. 3E, in one example the plurality of pins 307 protrudes from the top ring 310 and the bottom ring 312.

Figure 4:
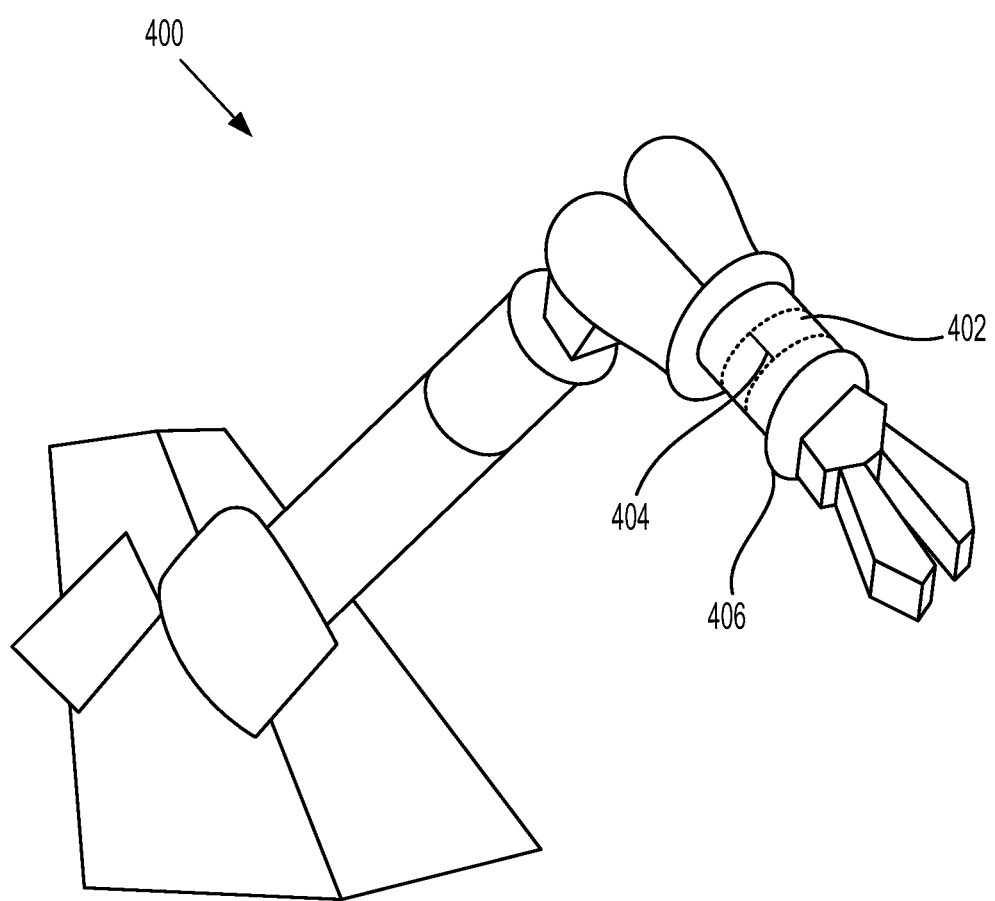
FIG. 4 illustrates an example robotic system.

FIG. 4 shows an example robotic system 400 where a cycloid transmission 402 may be implemented in order to assist with a rotational movement. The robotic system includes an end effector 406 that is used to interact within an environment.

A latch 404 permits access to the cycloid transmission 402 as is shown in FIG. 4. The ability to access the cycloid transmission 402 by use of the latch 404 will permit an outer chain link ring of the cycloid transmission 402 to be adjusted or replaced.

The outer chain link ring of the cycloid transmission 402 may be replaced when the robotic system starts to exhibit an unintended operation associated with a movement of the end effector 406. In one example, the outer chain link ring may be replaced with a second outer chain link ring. This may allow for the inspection of the outer chain link ring to ensure a proper amount of tension exists within the outer chain link ring. The ability to remove the outer chain link ring through the latch 404 may also permit the application of any necessary lubrication associated with the outer chain link ring.

Maintaining the outer chain link ring in an optimal state may permit the cycloid transmission 402 to operate in an effective manner and thereby allow for an intended operation of the robotic system 400.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A cycloid transmission comprising:
   a disc, wherein the disc includes a plurality of circular openings;
   a shaft for rotating the disc;
   a cage gear comprising:
      a plurality of pins;
      a top ring that is coupled to a bottom ring by the plurality of pins;
      a plurality of rollers covering the plurality of pins and positioned between the top ring and the bottom ring, wherein the plurality of rollers contact the disc as the disc rotates; and
   a housing for supporting the cage gear, wherein the housing comprises a plurality of slots for receiving the plurality of pins.

2. The cycloid transmission of claim 1, further comprising a plurality of output shaft rollers, wherein the plurality of output shaft rollers are inserted through the plurality of circular openings in order to stabilize a motion of the disc as the disc rotates.

3. The cycloid transmission of claim 1, further comprising a plurality of bushings that are positioned between the plurality of pins and the plurality of rollers for reducing a friction between the plurality of pins and the plurality of rollers as the plurality of rollers contact the disc.

4. The cycloid transmission of claim 1, wherein the plurality of pins protrudes from the bottom ring.

5. The cycloid transmission of claim 4, wherein the plurality of pins are inserted into the plurality of slots of the housing to secure the cage gear into the housing.

6. The cycloid transmission of claim 4, wherein the plurality of pins protrudes at every other location associated with the plurality of rollers.

7. The cycloid transmission of claim 1, wherein the plurality of pins protrudes from the top ring and the bottom ring.

8. The cycloid transmission of claim 1, wherein the disc comprises an outer edge and a plurality of teeth along the outer edge for interfacing with the cage gear.

9. A cycloid transmission comprising:
   a shaft for rotating a disc;
   a cage gear comprising:
      a plurality of pins;
      a top ring that is coupled to a bottom ring by the plurality of pins;
      a plurality of rollers covering the plurality of pins and positioned between the top ring and the bottom ring, wherein the plurality of rollers contact the disc as the disc rotates; and
   a housing for supporting the cage gear, wherein the housing comprises a plurality of slots for receiving the plurality of pins.

10. The cycloid transmission of claim 9, further comprising:
    the disc, wherein the disc includes a plurality of circular openings; and
    a plurality of output shaft rollers, wherein the plurality of output shaft rollers are inserted through the plurality of circular openings in order to stabilize a motion of the disc as the disc rotates,
    wherein the disc, the plurality of output shaft rollers, and the cage gear are inserted into the housing.

11. The cycloid transmission of claim 10, wherein the disc comprises an outer edge and a plurality of teeth along the outer edge for interfacing with the cage gear.

12. The cycloid transmission of claim 9, further comprising a plurality of bushings that are positioned between the plurality of pins and the plurality of rollers for reducing a friction between the plurality of pins and the plurality of rollers as the plurality of rollers contact the disc.

13. The cycloid transmission of claim 9, wherein the plurality of pins protrudes from the bottom ring.

14. The cycloid transmission of claim 13, wherein the plurality of pins are inserted into the plurality of slots of the housing to secure the cage gear into the housing.

15. The cycloid transmission of claim 13, wherein the plurality of pins protrudes at every other location associated with the plurality of rollers.

16. A cycloid transmission comprising:
    a disc, wherein the disc includes a plurality of circular openings;
    a shaft for rotating the disc;
    a cage gear into which the disc is positioned, the cage gear comprising:
       a plurality of pins;
       a top ring that is coupled to a bottom ring by the plurality of pins;
       a plurality of rollers covering the plurality of pins and positioned between the top ring and the bottom ring, wherein the plurality of rollers contact the disc as the disc rotates;
    a plurality of output shaft rollers, wherein the plurality of output shaft rollers are inserted through the plurality of circular openings of the disc to stabilize a motion of the disc as the disc rotates within the cage gear; and
    a housing for supporting the disc, the plurality of output shaft rollers, and the cage gear, wherein the housing comprises a plurality of slots for receiving the plurality of pins to secure the cage gear into the housing.

17. The cycloid transmission of claim 16, further comprising a plurality of bushings that are positioned between the plurality of pins and the plurality of rollers for reducing a friction between the plurality of pins and the plurality of rollers as the plurality of rollers contact the disc.

18. The cycloid transmission of claim 16, wherein the plurality of pins protrudes from the bottom ring.

* * * * *